United States Patent
Ashburn et al.

(10) Patent No.: US 6,362,608 B1
(45) Date of Patent: Mar. 26, 2002

(54) MULTI-PHASE SWITCHING CONVERTERS AND METHODS

(75) Inventors: Michael Anthony Ashburn, San Jose; Tunç Doluca, Saratoga; Chae Kun Lee, Campbell, all of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/775,422

(22) Filed: Feb. 1, 2001

(51) Int. Cl.$^7$ ............................. H02M 7/00; G05F 1/40; G05F 1/44
(52) U.S. Cl. ......................... 323/272; 323/282; 363/65
(58) Field of Search ........................... 363/65; 323/272, 323/282, 284

(56) References Cited

U.S. PATENT DOCUMENTS

| | | | |
|---|---|---|---|
| 4,371,919 A | | 2/1983 | Andrews et al. ............... 363/65 |
| 4,489,370 A | | 12/1984 | Migliori ....................... 363/26 |
| 5,144,222 A | * | 9/1992 | Herbert ........................ 323/271 |
| 5,477,132 A | | 12/1995 | Canter et al. ................ 323/282 |
| 5,583,753 A | | 12/1996 | Takayama ..................... 363/71 |
| 5,604,669 A | | 2/1997 | Strong, III .................... 363/17 |
| 5,684,683 A | | 11/1997 | Divan et al. ................... 363/65 |
| 5,719,491 A | | 2/1998 | Kolanko et al. ............. 323/303 |
| 5,737,202 A | | 4/1998 | Shimamori ................... 363/65 |
| 5,764,007 A | | 6/1998 | Jones ........................... 318/109 |
| 5,781,421 A | | 7/1998 | Steigerwald et al. .......... 363/21 |
| 5,870,296 A | | 2/1999 | Schaffer ....................... 363/65 |
| 6,052,790 A | * | 4/2000 | Brown ......................... 323/267 |
| 6,215,290 B1 | * | 4/2001 | Yang et al. .................. 323/282 |
| 6,323,755 B1 | * | 5/2001 | Zhang ......................... 323/282 |
| 6,262,566 B1 | * | 7/2001 | Dinh ........................... 323/282 |
| 6,278,263 B1 | * | 8/2001 | Walters et al. .............. 323/272 |

FOREIGN PATENT DOCUMENTS

| | | | |
|---|---|---|---|
| EP | 0 310 858 A2 | 4/1989 | ............. H02P/8/00 |
| EP | 0 369 954 A1 | 5/1990 | ............. H02P/7/00 |

OTHER PUBLICATIONS

Intersil Corporation, "HIP6301 Data Sheet—Microprocessor CORE Voltage Regulator Multi–Phase Buck PWM Controller", Mar. 2000.

Fairchild Semiconductor Corporation, "FAN5091 Data Sheet—Two Slice Interleaved Synchronous Buck Converter" 1998.

* cited by examiner

Primary Examiner—Bao Q. Vu
(74) Attorney, Agent, or Firm—Blakely, Sokoloff, Taylor & Zafman LLP

(57) ABSTRACT

Multi-phase switching converters and methods that provide fast response and low ripple on the converter inputs and outputs. The converters include multiple converter stages that are normally operated in sequence into a common load. However upon sensing that operation of one of the converter stages does not bring the converter back into regulation, multiple converter stages are operated until regulation is reestablished, after which the converter stages are operated in sequence again. In the embodiment disclosed, upon sensing that operation of one of the converter stages does not bring the converter back into regulation, all converter stages are operated until regulation is reestablished, after which the converter stages are operated in sequence again starting with the stage with the lowest inductor current.

30 Claims, 2 Drawing Sheets

US 6,362,608 B1

MULTI-PHASE SWITCHING CONVERTERS AND METHODS

BACKGROUND OF THE INVENTION

1. Field of the Invention

The present invention relates to the field of switching power supplies.

2. Prior Art

Switching DC-to-DC converters are well known in the prior art. Such converters include multi-phase converters wherein two or more switching converter stages deliver power to a common output terminal. Such converters normally operate in an interleaved manner, reducing the ripple on both the input and output of the converter. This, in turn, reduces the amount of filter capacitance needed on both the input and the output, which can reduce the overall cost and board space required for the converter. An example of a multi-phase converter is given in U.S. Pat. No. 5,870,296.

The present invention has among its various objects the achievement of multi-phase converters with a faster time response to sudden increases in the load on the converter output.

BRIEF SUMMARY OF THE INVENTION

Multi-phase switching converters and methods that provide fast response and low ripple on the converter inputs and outputs. The converters include multiple converter stages that are normally operated in sequence into a common load. However upon sensing that operation of one of the converter stages does not bring the converter back into regulation, multiple converter stages are operated until regulation is reestablished, after which the converter stages are operated in sequence again. In the embodiment disclosed, upon sensing that operation of one of the converter stages does not bring the converter back into regulation, all converter stages are operated until regulation is reestablished, after which the converter stages are operated in sequence again starting with the stage with the lowest inductor current. Various embodiments and a specific implementation are disclosed.

DETAILED DESCRIPTION OF THE PREFERRED EMBODIMENT

The multi-phase switching converters of the present invention control multiple drive stages in a switched-mode power supply, each driving a separate inductor, to a single output voltage. In the case of the exemplary embodiment, specifically a buck converter, a "stage" comprises a switch connected to the input supply voltage and a switch connected to ground. The output of these two switches is connected to an inductor that, in turn, is connected to the output. The switch connected to ground may be implemented as a diode and/or a MOS device. The benefits of using multiple stages to drive the output of the converter include reduced input ripple current, lower output voltage ripple, and easier board layout. The lower input ripple current results in less input capacitors being used, resulting in a cost savings. The lower output ripple voltage is more desirable to meet the tight requirements on DC voltage. This in turn results in a cost savings since more ESR (equivalent series resistance) is tolerable in the output capacitor, therefore requiring fewer output capacitors. Board layout is simplified by distributing the power dissipation throughout different drive stages. Thus, it becomes easier to spread the total power dissipation throughout different drive stages and to spread the total power dissipation across the board layout to avoid heat concentration and dissipation problems.

Basic Operation

The present invention provides multiple stage converters with super-fast transient response and closely matched inductor currents in each stage. Converters with two or more stages are contemplated by this invention, though for purposes of illustration and not for limitation, an exemplary buck two stage converter will be described in detail herein, as the present invention, once disclosed, may readily be applied to converter designs with three or more stages by those skilled in the art.

Figure 1:
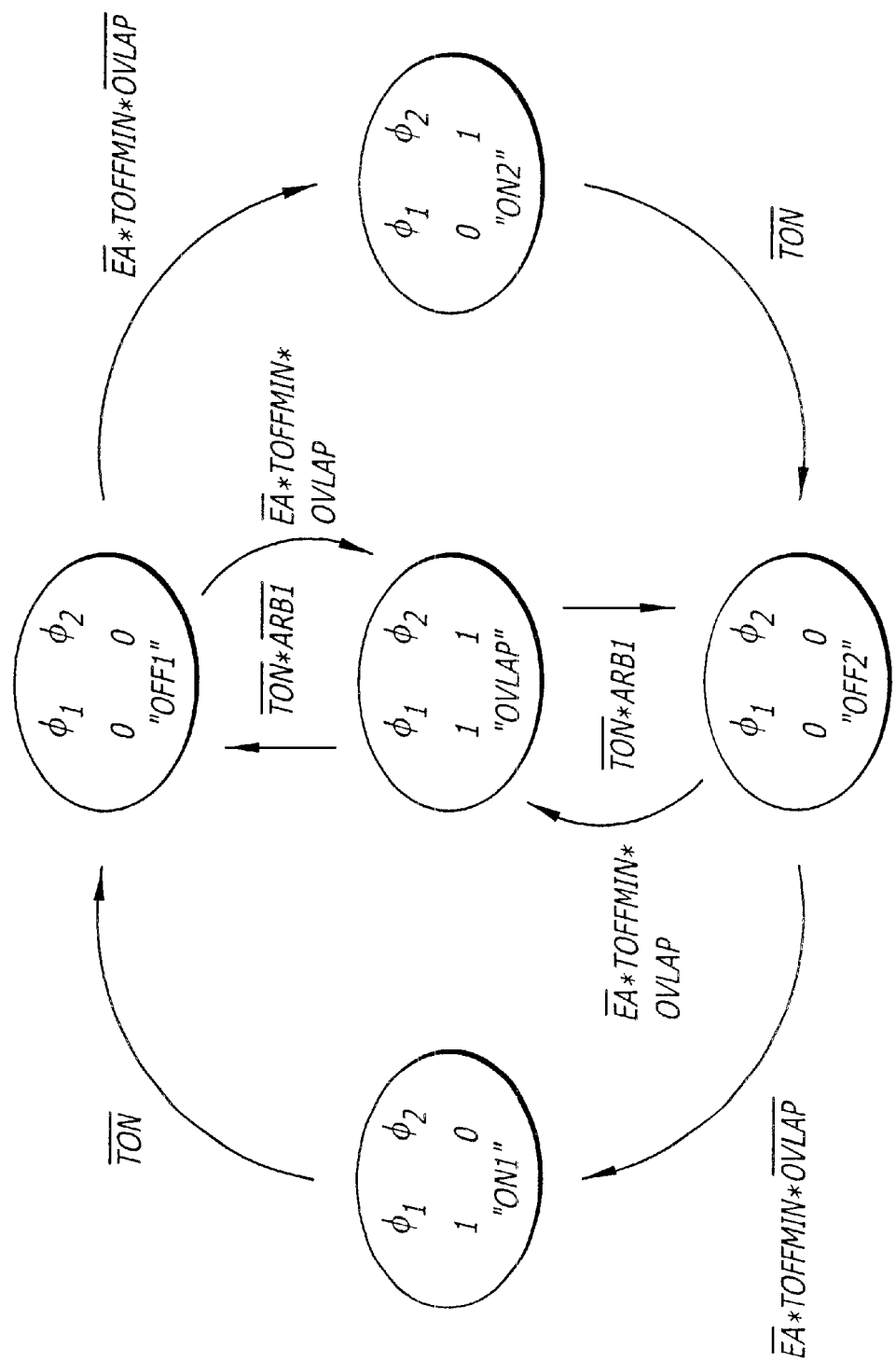
FIG. 1 is a state diagram for a two-phase (two stage) version of a multi-phase converter in accordance with the present invention.

A state diagram for a two-phase (two stage) version of a multi-phase converter is shown in FIG. 1. In this Figure, a "0" under $\phi_1$ and/or $\phi_2$ indicates that the respective high-side switch or switches connected to the input supply voltage is (are) "OFF". A "1" under $\phi_1$ and/or $\phi_2$ indicates that the respective high-side switch or switches is (are) "ON" and the low-side switch or switches connected to ground is (are) "OFF". "MINTOFF" represents the minimum time that all high-side switches must be "OFF" before another high-side pulse can be initiated. "TON" represents the length of the high-side switch ON-time. ARB1 is the output of a current comparator between $\phi 1$ and $\phi 2$. In the exemplary embodiment, the ON- time "TON" is fixed, while the off time "OFF" is generally controlled by the state machine.

Under steady-state conditions (no heavy load transients, not in start-up), the converter alternates between turning on the high-side switch for $\phi 1$, then turning on the high-side switch for $\phi 2$, as determined by an error-comparator. Thus, if the high-side switch of $\phi 2$ just turned on in response to the error-comparator determining the output had fallen below its regulation point, then the next time the error-comparator falls below its regulation point, the high-side switch on $\phi 1$ will be turned on.

Phase Overlap

An exception to $\phi 1/\phi 2$ alternating is the OVLAP (Phase-Overlap) mode. If a heavy load transient is detected, both the high-side switch on $\phi 1$ and the high-side switch on $\phi 2$ will be switched on at the same time. This provides the maximum ramp rate for the total inductor current possible. Thus, if after the high-side of one of the phases turns off, it is detected that a heavy load current transient has occurred (or any condition whereby the output does not return above its regulation point within a given period of time after a high-side switch turn-on), the second high side switch will be turned on also so that both high-side switches ($\phi 1$ and $\phi 2$) will be on. This is indicated as "OVLAP" (or Phase-Overlap) mode in FIG. 1.

Adaptive Phase Selection

To choose the next single phase after overlap is exited, a minimum current adaptive phase selection algorithm is used. If OVLAP mode is exited and the error-comparator determines the output has fallen below its regulation point, the subsequent (single) phase is selected by choosing the stage with the lowest inductor current. A comparator is used to determine the lower inductor current between the stages. For example, assume OVLAP mode has just been exited and the error-comparator has determined that the output is below its regulation point. If the current comparator indicates that φ1 has a lower inductor current than φ2, the high-side switch of φ1 will be switched "ON". Once a start phase has been selected coming out of OVLAP mode, the control algorithm will toggle between φ1 and φ2 under normal operating conditions as detailed above.

Current-Balance/ON-time selection

Note the currents in the different inductor stages will not necessarily be equal in this converter. In the absence of any current-balancing implementation, the series resistance of the high-side and low-side switches will act to ballast the currents in the different inductor stages and bring them together as determined by component matching between stages. Optionally, a current-balancing algorithm may be implemented with this converter to enforce equality between the inductor currents. One possibility would be to monitor the difference in inductor currents between the different stages and adjust the relative ON-times of the different stages to bring the currents together more quickly than would be the case with ballasting alone.

Over-Current

Optional current limit can be added to the state diagram by precluding a phase from asserting its high-side switch if a set current is exceeded. If current limits are used, φ1 and φ2 will not always alternate. When the error-comparator indicates a high-side pulse is necessary and the last phase selected was φ2, if the inductor current in φ1 is above its current limit and the inductor current in φ1 is not, φ2 will receive a successive high-side pulse instead of φ1. If φ2 is also above its current limit, neither phase will receive a high-side pulse. φ1 and φ2 can be switched in the preceding argument and the same holds true. Neither high-side can be switched "ON" if their current limit is exceeded.

N-stages

The description above was given for a two-stage architecture to facilitate the previous explanation. However the algorithm can be expanded to an arbitrary number of (N) stages. Basic operation for N-stages is given by the converter sequencing through high-side pulses on N-stages as controlled by a specific order (which can be set arbitrarily initially but cannot be altered until an OVLAP mode is entered and exited). If current limit is used and over-current is detected in a stage which is otherwise due to receive the next high-side ON-pulse, the next phase in the specific order of phases which does not currently exceed its over-current threshold will receive the high-side ON-pulse instead.

Overlap (OVLAP) mode is initiated the same way as the two-stage converter, with all N-stages turning on their high-side switches at the same time to maximize the ramp rate of the total inductor current. Adaptive phase selection after exiting OVLAP mode is accomplished by selecting the phase with the lowest inductor current. The second phase selected exiting OVLAP mode will be the phase with the second lowest inductor current, and so on and so forth. Note the "specific order" of the N sequenced phases is reset any time when OVLAP mode is exited. However once the specific sequence of states is set, it cannot be altered unless OVLAP is entered and exited again.

Implementation

Figure 2:
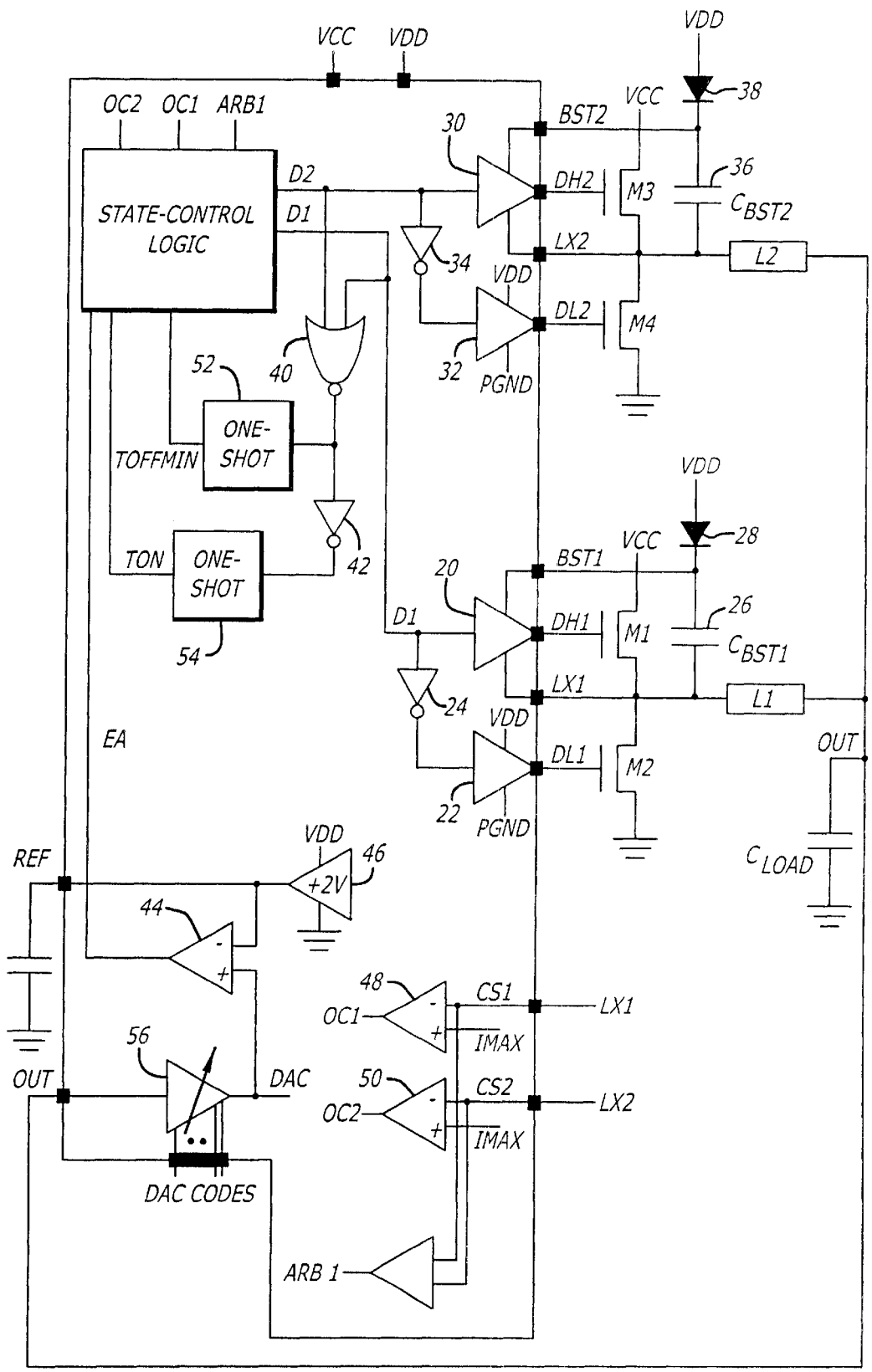
FIG. 2 is a logic diagram of one of many possible implementations of the converters of the present invention.

One of many possible implementations for the converters of the present invention is shown in FIG. 2. This embodiment is a two stage embodiment in accordance with the state diagram of FIG. 1. The first stage is comprised of a high side n-channel MOS transistor M1, a low side n-channel MOS transistor M2, inductor L1, gate drivers 20 and 22, inverter 24, boost capacitor 26 and diode 28. The second stage is comprised of a high side n-channel MOS transistor M3, a low side n-channel MOS transistor M4, inductor L2, gate drivers 30 and 32, inverter 34, boost capacitor 36 and diode 38. Inductors L1 and L2 are connected to the output terminal OUT, with capacitor $C_{LOAD}$ providing output filtering for the switch-mode power supply. Capacitors 26 and 36 are charged through diodes 28 and 38, respectively, when the voltages on terminals LX1 and LX2 are low, providing a voltages on the boost terminals BST1 and BST2 above the power supply voltage of the drivers 20 and 30 to provide a drive to the gates of transistors M1 and M3 well above the power supply voltage VDD, as is well known in the art.

The State-Control Logic block controls the separate phases (φ1, φ2) of the converter according to the state machine shown in FIG. 1. Signals D1 and D2 control the state of the MOS-switch gate drive voltages, including DH1, DL1, DH2, and DL2. Inductors L1 and L2 connect the two drive stages to the load capacitor. The output voltage, OUT, is fed-back to the converter where it is amplified by a variable gain DAC stage 56 before going into the error-comparator 44. When the output of the variable gain DAC stage 56 falls below the 2V output of voltage reference 46, the output EA of the error-comparator 44 goes low, indicating that the output has fallen below its regulation point. The ON-time of the high-side switches is controlled by one-shot 54 triggered through NOR gate 40 and inverter 42 when one or both of the switches is turned ON. Similarly, the MINT-OFF time is also controlled by a one-shot 52 that is triggered as one or both of the switches is turned OFF. An over-current condition in either or both stages is sensed by comparing the voltage across the low-side switches to a reference voltage IMAX in comparators 48 and 50. Note that in the exemplary embodiment, overcurrent is masked by the State Control Logic when the high-side switches are ON.

SUMMARY

Thus in the exemplary embodiment, starting (arbitrarily) in state 1 (the states being numbered in a small circle within the circle defining the states), the high side switch for the first stage will be on and the high side switch for the second stage will be off. After the predetermined ON-time ($\overline{TON}$ goes high), the high side switch for the first stage will be turned off and the low side switch for the first stage will be turned on (state 2). If after the predetermined OFF time (after TOFFMIN goes high), the output voltage OUT is above the regulation point (EA and $\overline{OVLAP}$ both high), both high side switches will remain off until the output voltage falls below the regulation point ($\overline{EA}$ goes high). Then the low side switch for the second stage will be turned off and the high side switch for the second stage will be turned ON (state 3), and after a predetermined ON-time ($\overline{TON}$ goes high), the high side switch for the second stage will be turned off and the low side switch for the second stage will be turned on (state 4). Now if after the predetermined OFF time (TOFFMIN goes high), the output voltage OUT is above the regulation point (EA and $\overline{OVLAP}$ both high), both high side switches will remain off until the output voltage again falls below the regulation point ($\overline{EA}$ goes high). Then the low side switch for the first stage will be turned off and the high side switch for the first stage will be turned ON, bringing the converter back to state 3.

However, if after the predetermined OFF time (after TOFFMIN goes high) when in state 2 or state 4, the output voltage OUT remains below the regulation point (EA and OVLAP both high), both low side switches will be turned off and both high side switches will be turned ON (state 5). After the predetermined TON period, both high side switches will be turned OFF and the two low side switches will be turned on. Now if after the minimum off time TOFFMIN, the output voltage OUT remains below the regulation point (EA and OVLAP both high), both low side switches will be turned off and both high side switches will be turned ON again (state 5), repeating the sequence until the output voltage OUT is above the regulation point. Finally, when both switches are turned off after the predetermined on time TON (end of state 5) and the output voltage OUT is above the regulation point, the converter will enter state 2 if the current in inductor L1 is higher than the current in inductor L2, or state 4 if the current in inductor L1 is lower than the current in inductor L2, as determined by the state of the comparison signal ARB1.

It will be noted that in the exemplary embodiment, the low side switch of each stage is a MOS transistor without a provision for blocking reverse currents through these switches by turning off each low side switch when the current in the respective inductor falls to zero. For many applications this is satisfactory, though if desired, any of the well know techniques for turning off the low side switches when the current would otherwise reverse may be incorporated with the present invention if desired. Also, it should be noted that the word switch as used herein and in the claims includes other types of transistors, such as by way of example, junction transistors, and in the case of the low side switches, diodes, which automatically turn on or conduct when forward biased and turn off or block current flow when reversed biased.

Advantages

The benefit of Phase Overlap is a super-fast response time to load current steps. By overlapping all drive phases (two in the exemplary embodiment, or possibly more in other embodiments) in response to a large load current step, the total output current slew rate (the sum of all the individual inductor currents) is maximized. This minimizes the total output capacitance needed to prevent excess negative voltage excursions by discharge of the output capacitor, therefore reducing total cost.

The Adaptive Phase selection minimizes the differential current between individual inductor stages. By selecting the output stage (phase) with the lowest inductor current as the next phase when exiting the Phase Overlap mode, the difference between currents in each stage will be minimized. By more closely matching the currents per stage, the total current rating of individual inductors will be reduced. This also results in lower total cost.

While preferred embodiments of the present invention have been disclosed herein, such disclosure is only for purposes of understanding exemplary embodiments and not by way of limitation of the invention. By way of example, the present invention is applicable to various other types of multi-phase switching converters as desired, including but not limited to converters including transformers for isolation and/or voltage conversion at their output, and are not limited merely to buck converters and/or converters having single coil inductors. Also, as alternate multi-phase converters and methods of operating such converters, the next converter stage to operate, not just after multiple stages have operated, but even after an individual stage has operated, could be chosen to be the converter stage with the lowest current. Thus in a two stage converter, the sequence of stage operation would normally be 1, 2, 1, 2, 1, 2 etc., but on occasion could be, by way of example, 1, 2, 1, 2, 2, 1, 2 etc. In a three stage converter, the sequence may change or even reverse, such as 1, 2, 3, 1, 2, 1, 3, 2, 1, 3, 2, 1 etc. Such embodiments, whether of two phases or more, has an inherent current balancing feature between stages, as the operation of a stage will be skipped as required for balancing purposes if its average current would otherwise tend to drift up. Thus it will be obvious to those skilled in the art that various changes in form and detail may be made in the invention and its application without departing from the spirit and scope of the invention as set out in the full scope of the following claims.

In the claims to follow, there are references to the initiation of operation of converter stages as well as the operation of converter stages. It is to be understood that "operation" of a converter stage or stages includes the partial operation of a converter stage or stages, as the present invention may be applied to the interleaved operation of multiple stages. As just one example, in the case of a buck converter without current reversal prevention as in the preferred embodiment, the low side switch is on so long as the high side switch is off. Therefore an operating cycle could be considered to be high side switch on and low side switch off, followed by the high side switch off and the low side switch on until a new cycle is initiated. However it is the initiation of the new cycle that technically ends the complete prior cycle. Similarly, even with reverse current prevention, the operation of the buck converter is complete for the purposes of the preferred embodiments when the high side switch has been off for a minimum time TOFFMIN, even if the inductor current is still substantial and the current reversal prevention (diode or switch) has yet to operate.

What is claimed is:

1. A method of operating a buck converter comprising:
   a) providing a plurality of buck converter stages operating into a common buck converter output;
   b) if after the prior operation of a buck converter stage, the buck converter output is not less than a regulation voltage, initiating the operation of the buck converter stages one at a time in a sequence, the operation of each buck converter stage being initiated when the buck converter output becomes less than a regulation voltage;
   c) if after the prior operation of a buck converter stage, the buck converter output is less than a regulation voltage, initiating the operation of multiple buck converter stages at a time;
   d) if after the prior operation of multiple buck converter stages at a time, the buck converter output is less than a regulation voltage, again initiating the operation of multiple buck converter stages at a time;
   e) if after the prior operation of multiple buck converter stages at a time, the buck converter output is not less than a regulation voltage, initiating the operation of the buck converter stages one at a time in a sequence, the operation of each buck converter stage being initiated when the buck converter output becomes less than a regulation voltage.

2. The method of claim 1 wherein in e), the sequence is determined by initiating the operation of the buck converter stage that has the lowest inductor current first.

3. The method of claim 1 wherein the number of buck converter stages is two.

4. The method of claim 1 wherein in c) and d), the multiple buck converter stages initiated comprise the full plurality of buck converter stages.

5. The method of claim 1 wherein the buck converter stages are controlled by a state machine.

6. The method of claim 1 wherein each converter stage has a high side switch, a low side switch and an inductor, the high side switch of each buck converter stage being turned on for a predetermined time when the operation of the respective buck converter stage is initiated, the respective low side switch being turned on when the high side switch is turned off.

7. A buck converter comprising:
a plurality of buck converter stages, each having an inductor coupled to a common output;
a buck converter controller responsive to an output voltage of the buck converter to control the plurality of buck converter stages, the buck converter controller:
  a) initiating the operation of the buck converter stages one at a time in a sequence, each buck converter stage being initiated when the buck converter output becomes less than a regulation voltage if after the prior operation of a buck converter stage, the buck converter output is not less than a regulation voltage;
  b) initiating the operation of multiple buck converter stages at a time if after the prior operation of a buck converter stage, the buck converter output is less than a regulation voltage;
  c) again initiating the operation of multiple buck converter stages at a time if after the prior operation of multiple buck converter stages at a time, the buck converter output is less than a regulation voltage; and,
  d) initiating the operation of the buck converter stages one at a time in a sequence, each buck converter stage being operated when the buck converter output becomes less than a regulation voltage, if after the prior operation of multiple buck converter stages at a time, the buck converter output is not less than a regulation voltage.

8. The buck converter of claim 7 wherein the buck converter initiates the operation of the buck converter stages in a sequence determined by the buck converter stage that has the lowest inductor current when after the controller has operated multiple buck converter stages at a time, the buck converter output is not less than a regulation voltage.

9. The buck converter of claim 7 wherein the number of buck converter stages is two.

10. The buck converter of claim 7 wherein in b) and c), the buck converter controller initiates the operation of the full plurality of buck converter stages.

11. The buck converter of claim 7 wherein the buck converter controller is a state machine.

12. The buck converter of claim 7 wherein each converter stage has a high side switch, a low side switch and an inductor, the buck converter controller turning on the high side switch of each buck converter stage for a predetermined time when the operation of the respective buck converter stage is initiated, the buck converter turning on the respective low side switch when the high side switch is turned off.

13. A method of operating a switching converter comprising:
  a) providing a plurality of switching converter stages operating into a common switching converter output;
  b) if after the prior operation of a switching converter stage, the switching converter output is not less than a regulation voltage, initiating the operation of the switching converter stages one at a time in a sequence, the operation of each switching converter stage being initiated when the switching converter output becomes less than a regulation voltage;
  c) if after the prior operation of a switching converter stage, the switching converter output is less than a regulation voltage, initiating the operation of multiple switching converter stages at a time;
  d) if after the prior operation of multiple switching converter stages at a time, the switching converter output is less than a regulation voltage, again initiating the operation of multiple switching converter stages at a time; and,
  e) if after the prior operation of multiple switching converter stages at a time, the switching converter output is not less than a regulation voltage, initiating the operation of the switching converter stages one at a time in a sequence, the operation of each switching converter stage being initiated when the switching converter output becomes less than a regulation voltage.

14. The method of claim 13 wherein in e), the sequence is determined by initiating the operation of the switching converter stage that has the lowest inductor current first.

15. The method of claim 13 wherein the number of switching converter stages is two.

16. The method of claim 13 wherein in c) and d), the multiple switching converter stages initiated comprise the full plurality of switching converter stages.

17. The method of claim 13 wherein the switching converter stages are controlled by a state machine.

18. A switching converter comprising:
a plurality of switching converter stages, each having an inductor coupled to a common output;
a switching converter controller responsive to an output voltage of the switching converter to control the plurality of switching converter stages, the switching converter controller:
  a) initiating the operation of the switching converter stages one at a time in a sequence, each switching converter stage being initiated when the switching converter output becomes less than a regulation voltage if after the prior operation of a switching converter stage, the switching converter output is not less than a regulation voltage;
  b) initiating the operation of multiple switching converter stages at a time if after the prior operation of a switching converter stage, the switching converter output is less than a regulation voltage;
  c) again initiating the operation of multiple switching converter stages at a time if after the prior operation of multiple switching converter stages at a time, the switching converter output is less than a regulation voltage; and,
  d) initiating the operation of the switching converter stages one at a time in a sequence, each switching converter stage being initiated when the switching converter output becomes less than a regulation voltage, if after the prior operation of multiple switching converter stages at a time, the switching converter output is not less than a regulation voltage.

19. The switching converter of claim 18 wherein the switching converter initiates the operation of the switching converter stages in sequence determined by the switching converter stage that has the lowest inductor current when after the controller has operated multiple switching converter stages at one time, the switching converter output is not less than a regulation voltage.

20. The switching converter of claim 18 wherein the number of switching converter stages is two.

21. The switching converter of claim 18 wherein in b) and c), the switching converter controller initiates the operation of the full plurality of switching converter stages.

22. The switching converter of claim 18 wherein the switching converter controller is a state machine.

23. A method of operating a switching converter comprising:
   a) providing a plurality of switching converter stages operating into a common switching converter output;
   b) if after the prior operation of a switching converter stage, the switching converter output is not less than a regulation voltage, initiating the operation of the switching converter stages one at a time, the switching converter stage with the lowest current being initiated when the switching converter output becomes less than a regulation voltage;
   c) if after the prior operation of a switching converter stage, the switching converter output is less than a regulation voltage, initiating the operation of multiple switching converter stages at a time;
   d) if after the prior operation of multiple switching converter stages at a time, the switching converter output is less than a regulation voltage, again initiating the operation of multiple switching converter stages at a time; and,
   e) if after the prior operation of multiple switching converter stages at a time, the switching converter output is not less than a regulation voltage, initiating the operation of the switching converter stages one at a time, the switching converter stage with the lowest current being initiated when the switching converter output becomes less than a regulation voltage.

24. The method of claim 23 wherein the number of switching converter stages is two.

25. The method of claim 23 wherein in c) and d), the multiple switching converter stages initiated comprise the full plurality of switching converter stages.

26. The method of claim 23 wherein the switching converter stages are controlled by a state machine.

27. A switching converter comprising:
   a plurality of switching converter stages, each having an inductor coupled to a common output;
   a switching converter controller responsive to an output voltage of the switching converter to control the plurality of switching converter stages, the switching converter controller:
      a) initiating the operation of the switching converter stages one at a time, the switching converter stage with the lowest current being operated when the switching converter output becomes less than a regulation voltage if after the prior operation of a switching converter stage, the switching converter output is not less than a regulation voltage;
      b) initiating the operation of multiple switching converter stages at a time if after the prior operation of a switching converter stage, the switching converter output is less than a regulation voltage;
      c) again initiating the operation of multiple switching converter stages at a time if after the prior operation of multiple switching converter stages at a time, the switching converter output is less than a regulation voltage; and,
      d) initiating the operation of the switching converter stages one at a time, the switching converter stage with the lowest current being initiated when the switching converter output becomes less than a regulation voltage, if after the prior operation of multiple switching converter stages at a time, the switching converter output is not less than a regulation voltage.

28. The switching converter of claim 27 wherein the number of switching converter stages is two.

29. The switching converter of claim 27 wherein in b) and c), the switching converter controller initiates the full plurality of switching converter stages.

30. The switching converter of claim 27 wherein the switching converter controller is a state machine.

* * * * *